United States Patent
Stav et al.

(10) Patent No.: US 12,071,376 B2
(45) Date of Patent: Aug. 27, 2024

(54) GYPSUM BOARD WITH IMPROVED STARCH BINDER

(71) Applicant: Gold Bond Building Products, LLC, Charlotte, NC (US)

(72) Inventors: Eli Stav, Charlotte, NC (US); Ma-Ikay Miatudila, Monroe, NC (US)

(73) Assignee: Gold Bond Building Products, LLC, Charlotte, NC (US)

( * ) Notice: Subject to any disclaimer, the term of this patent is extended or adjusted under 35 U.S.C. 154(b) by 0 days.

(21) Appl. No.: 18/321,035

(22) Filed: May 22, 2023

(65) Prior Publication Data

US 2023/0286864 A1    Sep. 14, 2023

Related U.S. Application Data

(63) Continuation of application No. 14/575,867, filed on Dec. 18, 2014, now Pat. No. 11,697,618.

(60) Provisional application No. 61/919,450, filed on Dec. 20, 2013.

(51) Int. Cl.
  *C04B 28/14* (2006.01)
  *C04B 24/38* (2006.01)
  *C04B 111/00* (2006.01)

(52) U.S. Cl.
  CPC ............ *C04B 28/145* (2013.01); *C04B 24/38* (2013.01); *C04B 2111/0062* (2013.01); *Y10T 428/31971* (2015.04)

(58) Field of Classification Search
  None
  See application file for complete search history.

(56) References Cited

U.S. PATENT DOCUMENTS

| | | |
|---|---|---|
| 2,845,417 A | 7/1958 | Kesler et al. |
| 6,051,700 A | 4/2000 | Wang |
| 6,221,151 B1 | 4/2001 | Campbell et al. |
| 6,632,550 B1 | 10/2003 | Yu et al. |
| 2005/0048190 A1 | 3/2005 | Trksak |
| 2005/0126437 A1 | 6/2005 | Tagge et al. |
| 2005/0223949 A1 | 10/2005 | Bailey |
| 2007/0032393 A1 | 2/2007 | Patel et al. |
| 2007/0082170 A1 | 4/2007 | Colbert et al. |
| 2012/0207989 A1 | 8/2012 | Xu |
| 2013/0081554 A1 | 4/2013 | Cao |
| 2013/0216762 A1 | 8/2013 | Chun |
| 2014/0113124 A1* | 4/2014 | Sang ............... E04C 2/043 156/39 |
| 2014/0113128 A1 | 4/2014 | Sang et al. |
| 2015/0010767 A1 | 1/2015 | Sang et al. |
| 2018/0009129 A1 | 1/2018 | Whittington et al. |

FOREIGN PATENT DOCUMENTS

| | | |
|---|---|---|
| EP | 1786863 | 5/2014 |
| WO | WO2016209942 | 12/2016 |

OTHER PUBLICATIONS

PCT Application No. PCT/US2014/071285, Third Party Observation, Apr. 19, 2016.

\* cited by examiner

*Primary Examiner* — Cheng Yuan Huang
(74) *Attorney, Agent, or Firm* — Dority & Manning, P.A.

(57) ABSTRACT

Gypsum board having improved performance is obtained by controlling the distribution of starch in the gypsum core of the board and the gelling temperature of the starch. Starch migration in the board is controlled by the degree of acid-modification, to adjust the starch viscosity profile. The starch gelling temperature is controlled by chemical modification of the starch —OH groups.

14 Claims, 4 Drawing Sheets

GYPSUM BOARD WITH IMPROVED STARCH BINDER

This application is a continuation of U.S. application Ser. No. 14/575,867, now U.S. Pat. No. 11,697,618, filed Dec. 18, 2014, which claims the benefit of U.S. Provisional Application No. 61/919,450, filed Dec. 20, 2013, which are both hereby incorporated by reference in their entirety.

BACKGROUND OF THE INVENTION

The present invention generally relates to gypsum board, and more specifically to compositions for gypsum board comprising acid-modified starch binders.

Gypsum wallboard typically comprises a gypsum core sandwiched between two sheets of facing material (e.g., paper)—i.e. a composite structure made from a gypsum core disposed between two facers, and having two paper-core interfaces between the gypsum core and facers. The gypsum core is commonly produced from a gypsum slurry that is prepared as a mixture of dry and wet ingredients. The dry ingredients consist primarily of calcium sulfate hemihydrate (stucco), and may include, but are not limited to, any combination of fiberglass, accelerator, vermiculate, potash, crystal modifiers, boric acid and/or a natural polymer such as starch. The wet ingredients consist of water and a variety of other components that commonly include, but are not limited to, paper pulp and potash (the "pulp paper solution"), dispersants, retarders, polymers, wax emulsion, silicone, surfactants, and thickening agent. If present, the pulp paper solution along with the gauging water provide a significant portion of the water that forms the gypsum slurry of the core composition of the wallboard. The dry ingredients, gauging water, and the pulp paper solution contain the basic chemical components of a piece of wallboard.

Methods for manufacturing gypsum wallboard are well known in the art and commonly involve a continuous process. The wet and dry ingredients, gauging water, and pulp paper solution are typically mixed together in a pin mixer to create a fluid mixture or "slurry". The slurry is discharged from the mixer through the mixer's outlet chute or "boot" which spreads the slurry onto a moving, continuous sheet of bottom facing material (back). After the slurry is discharged onto the bottom facing material, a moving, continuous sheet of top facing material (face) is placed on the slurry, so that the slurry is sandwiched between the top and bottom facing materials to form the board. The board then passes through a forming station which forms the wallboard to the desired thickness and width. Although the facing material is described as paper, other materials known in the art may be used as a facing material, such as fiberglass mat.

The board travels along a belt line for several minutes, during which time the stucco and water rapidly undergo a hydration reaction and the board stiffens and "sets". In the hydration reaction, the calcium sulfate hemihydrate is hydrated to form crystals of calcium sulfate dihydrate, according to the following equation:

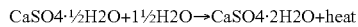

$CaSO4 \cdot \frac{1}{2}H2O + 1\frac{1}{2}H2O \rightarrow CaSO4 \cdot 2H2O + heat$ The reaction time can be controlled to a certain extent by the use of additives such as accelerators and retarders. The boards are then cut into a desired length and fed into a large, continuous kiln for drying. During the drying process, the excess water (free water) is evaporated from the gypsum core while the chemically bound water is retained in the newly formed gypsum crystals.

Gypsum wallboard is often produced by incorporating an aqueous foam into the gypsum slurry, to enhance the fluidity of the slurry and control the core density and overall weight of the wallboard. As the gypsum slurry sets, the cells/bubbles of the aqueous foam create air pockets in the gypsum core of the wallboard. The aqueous foam typically comprises foam water, a foaming solution (e.g., soap) and air, and may be generated using various mechanical foam generation devices as are known in the art.

The incorporation of an aqueous foam in the gypsum slurry also may have the detrimental effect of reducing the compressive strength or core strength of the wallboard and the bond between the gypsum core and facing material. The gypsum board gets its strength from the formation and interlocking of the calcium sulfate dihydrate crystals during the hydration reaction and the formation of a bond between the core and the facer. The presence of foam cells reduces the density of the gypsum core and the compressive strength and nail pull of the wallboard.

The calcium sulfate dihydrate crystals also interlock with the fibers of the facing material at the paper-core interface to form the paper to core bond. The foam cells at the paper-core interface can prevent the formation of a uniform paper to core bond, and cause a decrease in the strength of the paper to core bond. While the terms "paper-core interface" and "paper to core bond" are used, they are not intended to be limiting and may apply to fiberglass mat or other facing materials as are known in the art.

Natural polymers, such as acid modified starches, are commonly added to the gypsum slurry with the dry and/or wet ingredients, to improve the compressive strength of the wallboard and strengthen the paper to core bond. The starch acts as co-binder to improve the adhesion between the gypsum crystals in the gypsum core, and increases the core strength and nail pull of the wallboard. The starch similarly improves the adhesion between the gypsum crystals and the fibers of the facing material (e.g., cellulose fibers) at the paper-core interface. Acid modified starch gels during drying of the wallboard and migrates to the paper-core interface with the evaporating water. Once cooled, it forms a film and acts as a binder between the facers and the core and between the gypsum crystals (i.e. a co-binder). Its presence at the paper-core interface causes a stronger bond to form between the gypsum core and the facing material. To obtain a good paper to core bond in combination with good co-binding effect in the gypsum core, it would be desirable to control the ratio between the migrating starch at the paper-core interface and the non-migrating starch in the gypsum core.

SUMMARY OF THE INVENTION

Gypsum board and methods of producing gypsum board with improved properties are disclosed, having a composition including a starch that is acid modified to a certain degree to control its migration in the core to a specific ratio and/or that is chemically modified to reduce the peak gelling temperature of the starch and improve cooking of the starch. In one embodiment, the gypsum board is formed from a gypsum slurry having a composition comprising stucco and an acid modified starch having a peak viscosity of between about 200 BU to about 2000 BU. In another embodiment, the gypsum board comprises a gypsum core formed from a gypsum slurry comprising stucco and an acid modified starch, the gypsum core having a front side, a back side, and a center core between the front and back sides. A facing material is disposed at the front and back sides of the gypsum core. The gypsum core has a ratio of acid modified starch content of the near the front and back facing material to the acid modified starch content in the center core of between about 1.0 to 1.7. In yet another embodiment, the gypsum board is formed from a gypsum slurry having a composition comprising stucco and a starch that is chemically modified to reduce hydrogen bonding. In a preferred embodiment, the starch has a plurality of —OH groups that are chemically modified by ethoxylation with ethylene oxide, wherein the starch has a peak gelling temperature of about 180° F. or less.

DETAILED DESCRIPTION OF THE INVENTION

Improvements in gypsum board properties have been obtained by increasing the binding effects of the starch in the board core. The improved starch binding is obtained by varying the acid modification of the starch to change the migration profile and distribution of the starch in the core, and also by reducing the starch gelling temperature to ensure complete cooking of the starch during board manufacture. The starch in the gypsum core improves the adhesion between the gypsum crystals themselves (i.e. a co-binder). Starch that migrates to the paper-core interface improves adhesion between the gypsum crystals and the paper fibers (e.g. cellulose fibers). To maintain good paper/core bond together with good co-binding effect in the core, it is important to find the right ratio between the migrating and the non-migrating parts of the starch or starch mixture/blend. This can be done by controlling the degree of acid modification of the starch(es).

During the drying process in the kiln, starch will partially migrate with the water from the gypsum core to the face and back papers. Acid modification (hydrolysis) of starch is well known in the art, and cleaves and reduces the size of the starch polymer. By controlling the degree of acid modification, one can vary the starch viscosity. The higher the degree of acid modification, the lower the viscosity of the starch (thinner) and the more the starch will migrate. To retain more starch (acid modified) in the core, it is important to increase the starch's viscosity after it passes its gelling temperature.

Figure 1:
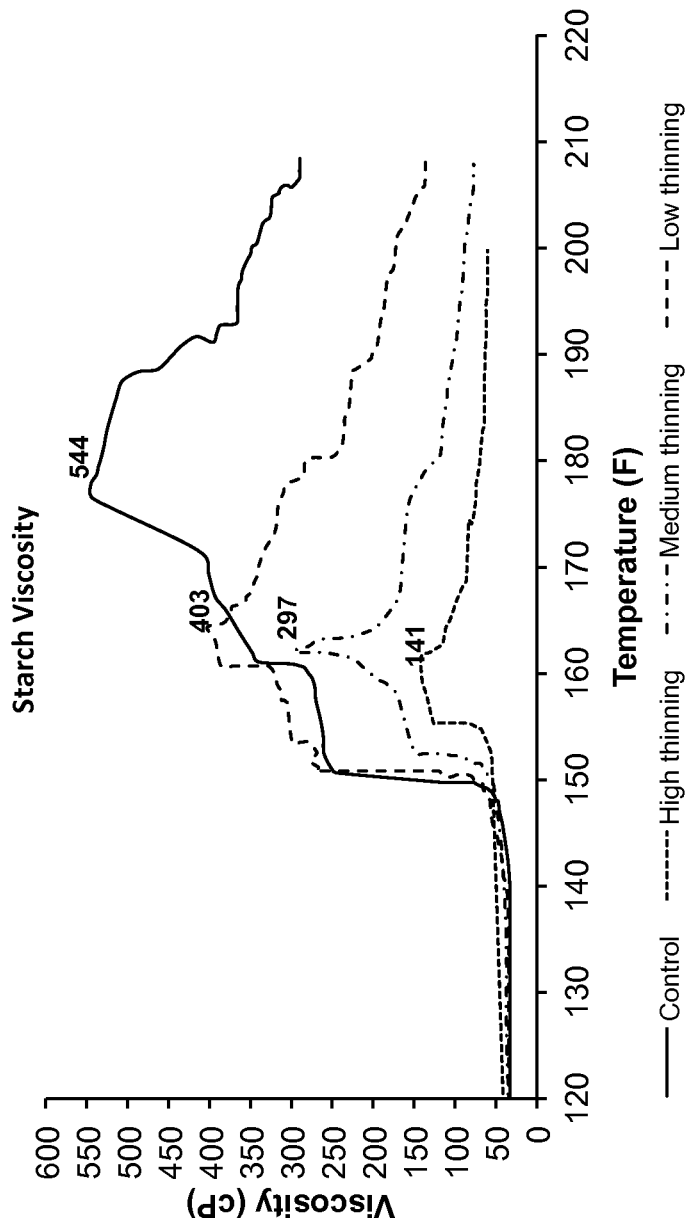
FIG. 1 is a data plot of temperature and viscosity of conventional, low thinning, medium thinning and high thinning starch.
Figure 2B:
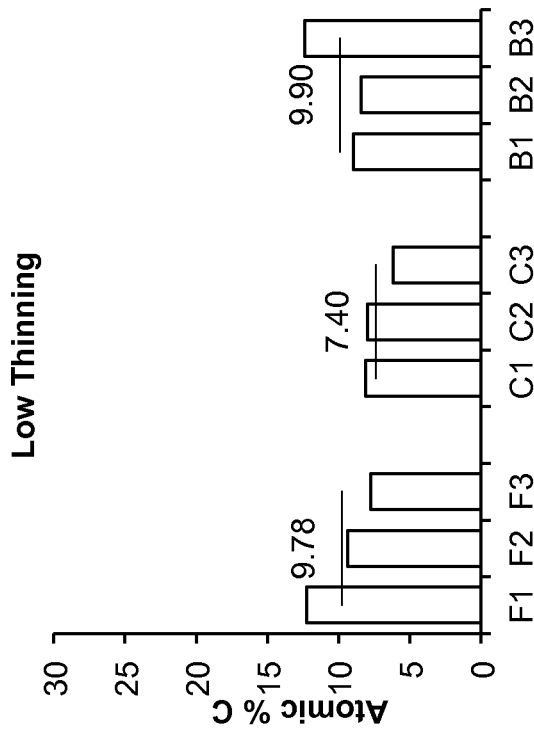
FIG. 2B is a data plot of low thinning starch migration in a gypsum board based on carbon counting EDS.
Figure 2A:
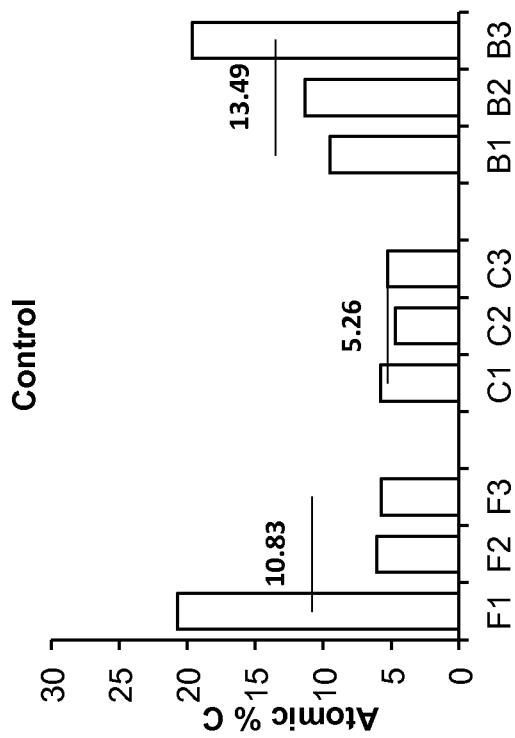
FIG. 2A is a data plot of conventional starch migration in a gypsum board based on carbon counting EDS.

As shown in FIGS. 1, 2A and 2B, higher modification (thinning) will result in lower viscosity after gelling and, therefore, more migration and vice versa. The effect of acid modification on viscosity is shown in FIG. 1. The commercially available unmodified pearl starch Clinton 106 (Archer Daniels Midland Company—Decatur IL) was used as a control. Starches having different levels of thinning were obtained from Tate & Lyle (Decatur, IL). A starch suspension in water was cooked over a temperature range and time. The viscosity of the suspension was measured using a rheometer, such as a Brookfield DV3T Rheometer (Brookfield Engineering Labs., Inc.—Middleboro, MA). Alternatively, viscosity was measured by Amylograph (Brabender GmbH & Co.—Germany). The unmodified control starch was found to have a peak viscosity of about 544 cP. Increased acid modification resulted in decreased viscosity—with low thinning starch having a peak viscosity of about 403 cP, medium thinning about 297 cP, and high thinning about 141 cP.

Referring to FIGS. 2A and 2B, an embodiment of a gypsum board having improved starch binder is shown. High strength, lightweight gypsum board was prepared in the laboratory by conventional methods from compositions comprising an unmodified control or low thinning starch. The gypsum slurry composition contained about 2% starch based on the stucco weight. The migration of the starch in the board was determined based on the carbon content near the face (F), at the center (C) and near back (B) of the gypsum core as measured by EDS (EDAX Inc.—Mahwah, NJ). Gypsum board samples were analyzed using an EDS (energy dispersive X-ray spectroscopy) system attached to a scanning electron microscope (SEM), as is known in the art. The board samples were prepared for SEM imagery by scoring, snapping and cutting to a predetermined height, and then brought into focus and taken to the designated working distance and magnification. The carbon atomic percentage was then measured at nine locations across the board sample—three locations near the face paper (F1, F2, F3), three locations at the center of the sample (C1, C2, C3), and three locations near the back paper (B1, B2, B3). For each location, three adjacent rectangular boxes were drawn and analyzed separately. For the face paper and back paper locations, the first box is drawn as close as possible to the paper-core interface, without having paper fibers included in the analysis (e.g., within about 150µ of the paper fibers and more preferably within about 100µ). As shown in FIGS. 2A and 2B, conventional starch migrates toward the front (F1) and back (B3) surfaces of the board, whereas low thinning starch maintains a more uniform distribution in the board.

Figure 3:
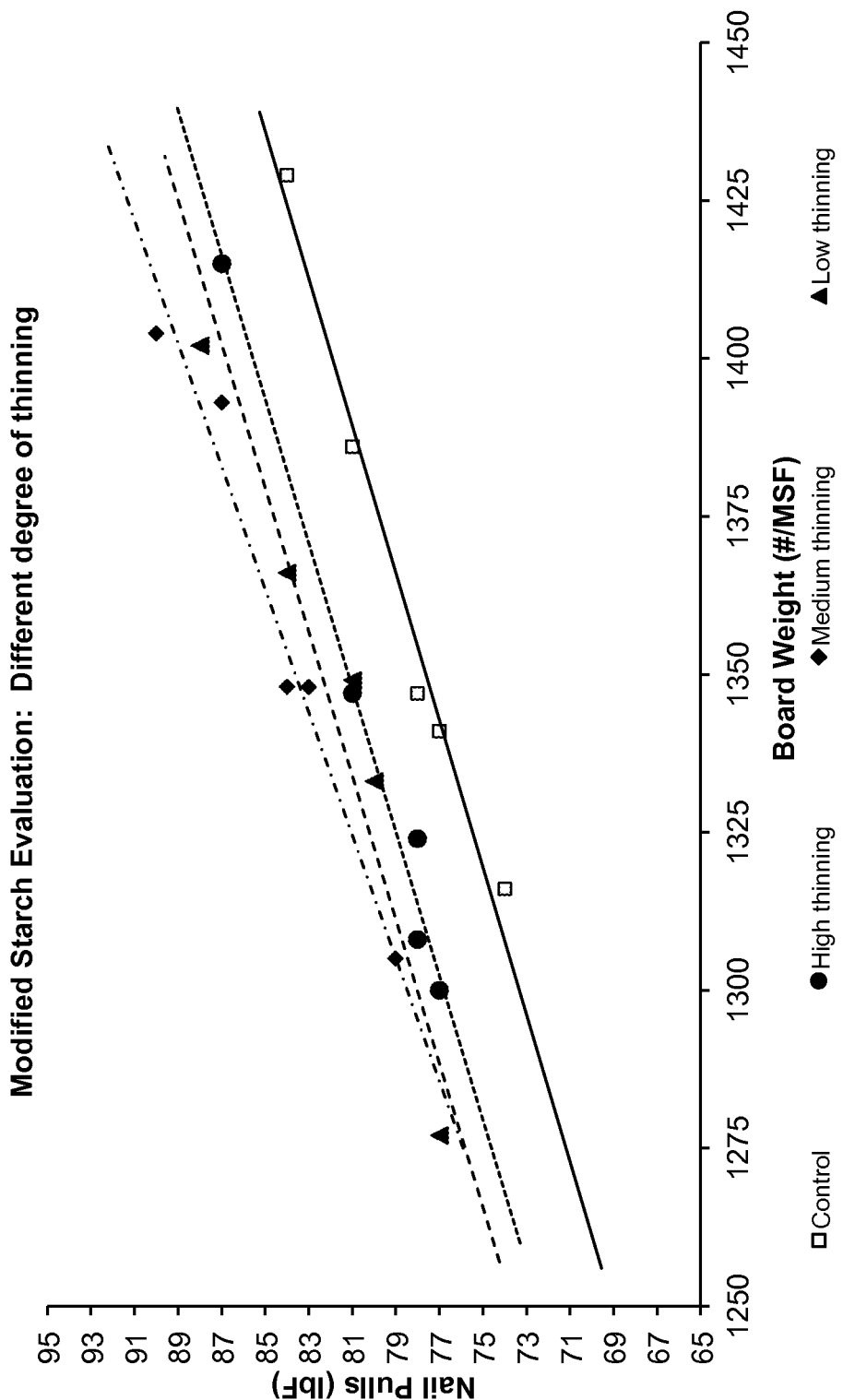
FIG. 3 is a data plot of board weight and nail pull strength of gypsum board comprising conventional, low thinning, medium thinning and high thinning starch.

Referring to FIG. 3, an example of a gypsum board having improved starch binder is shown. Gypsum board was prepared in the laboratory by conventional methods from compositions comprising an unmodified control, low thinning, medium thinning or high thinning starch. The nail pull strength of the gypsum boards was measured against the board weight using ASTM C473 standard test methods, as are known in the art.

As shown in FIG. 3, gypsum board prepared using low and medium thinning starches exhibited higher nail pull strength compared to high thinning or control starches. By reducing the ratio of migrating (face, back) to non-migrating (center core) starch(es) from about 3.8-4 (control) to about 1.2-1.5 (low thinning), the resulting board nail pull values are increased by about 5 to 8 lbf. More preferably, the ratio is reduced to about 1.0-1.7. Those of skill in the art will appreciate that this ratio can be varied according to starch modification, as may be required to provide the desired properties of the gypsum board.

The lab results showed that there is a correlation between the level of starch thinning (viscosity), starch migration in the core and board performance properties. Thus, starch migration/movement through the core can be controlled to achieve improved board performance properties—e.g., nail pull performance and paper/core bond. For example, nail pull performance can be improved by controlling the degree of starch migration in the core—e.g., by adjusting the starch viscosity profile. The starch viscosity profile can be modified by changing the degree of acid modification.

In another embodiment, the starch gelling temperature range can be adjusted to control the gelling process of the starch in the core. In particular, the co-binding effect of starch(es) is further improved by reducing the gelling temperature of the starch to ensure that the starch completely gels in the gypsum core during the production process, and when cooled it forms a strong film. It is believed that the starch film in the gypsum core acts as binder that improves the adhesion between the gypsum crystals. Unmodified starch (e.g., pearl starch) has a gelling temperature that is too high and is often not fully cooked during the drying process. By adjusting the starch gelling temperature range, one can completely utilize the starch in the core by fully cooking it. This complete utilization results in improved board properties and potential cost savings by reduction in starch usage.

The reduction of the starch gelling temperature can be achieved by controlling the type and amount of chemical modification of the starch. For example, the —OH groups on the starch molecule may be replaced with other groups to reduce hydrogen bonding between the starch molecules, such as by ethoxylation. Those of skill in the art will appreciate that other types of chemical modification may be used to reduce hydrogen bonding, such as modification with other alkyl groups or by oxidation. In a preferred embodiment, the —OH groups on the starch molecule are partially replaced by ethylene oxide, which reduces the hydrogen bonding between starch molecules and lowers the peak gelling temperature of the starch—i.e. the temperature at which the starch completely gels and reaches its maximum viscosity.

To ensure complete gelling during the drying process, it is desirable to use a modified starch that has a peak gelling temperature at or preferably below the temperature of the drying process—e.g., a peak gelling temperature of about 180° F. or less, preferably about 170° F. or less, and more preferably about 165° F. or less. In a particularly preferred embodiment, the starch is modified to have a peak gelling temperature in a range between about 150° F. to about 165° F.

Modification of the starch to reduce the peak gelling temperature may be combined with acid modification to adjust the starch viscosity and further improve nail pull and compressive strength. In a preferred embodiment, the acid modified starch has a peak viscosity in the range between about 200 BU to about 2000 BU, where slight acid modification corresponds to a peak viscosity in a range between about 800 BU to about 2000 BU, and more acid modification corresponds to a peak viscosity in a range of about 200 BU to about 800 BU.

Figure 4:
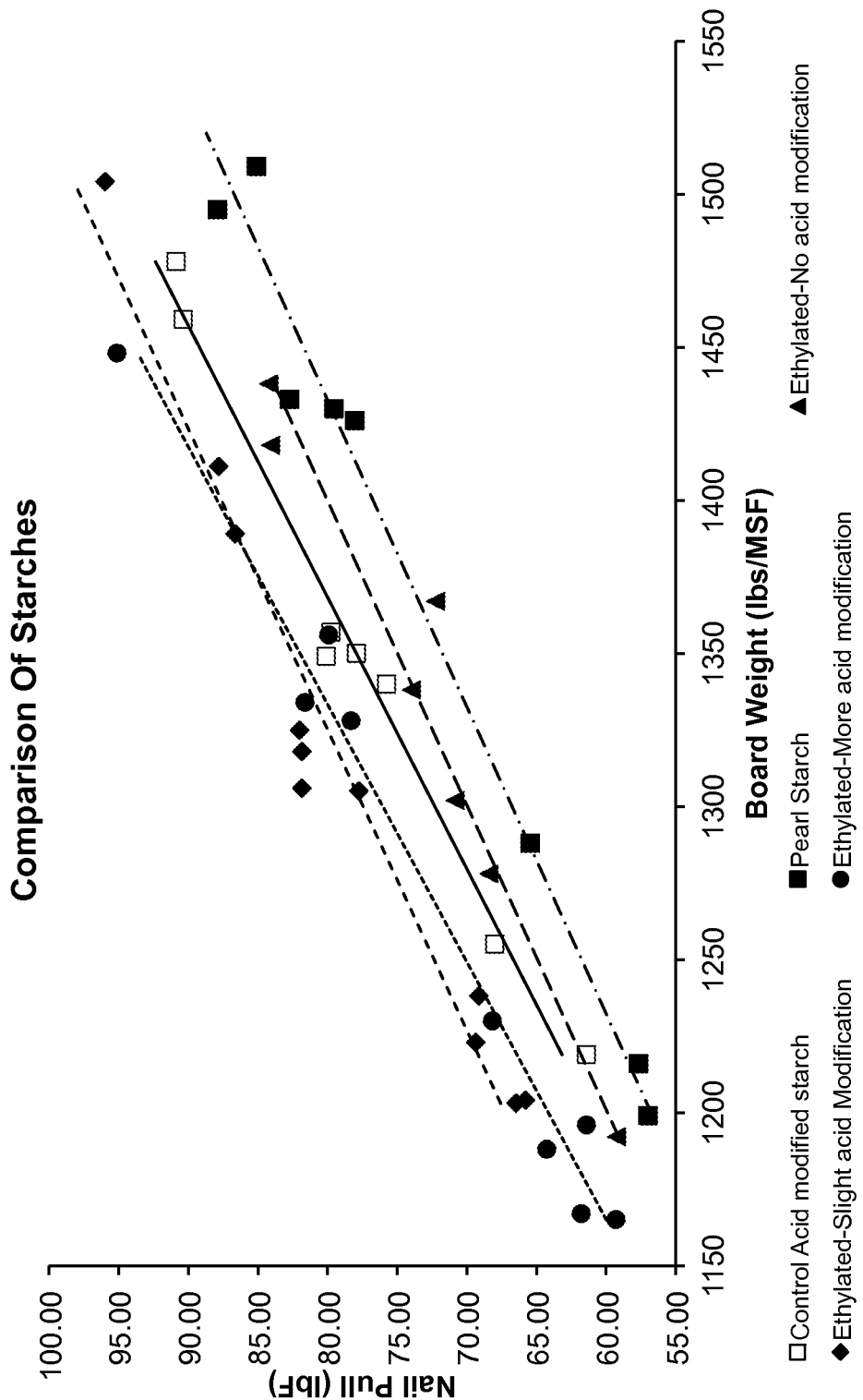
FIG. 4 is a data plot of board weight and nail pull strength of gypsum board comprising conventional, low thinning and medium thinning starch, with and without ethylation.

Referring to FIG. 4, starches were modified by ethylation to reduce peak gelling temperature in combination with acid modification to further improve the compressive strength of the gypsum board. Gypsum board was prepared in the laboratory by conventional methods from compositions comprising starches with and without ethylation, and with and without acid modification. The ethylated starches used in the gypsum board were commercially available from Archer Daniels Midland Company (Decatur, IL) as Clineo 700 (ethylated, no acid modification), Clineo 706 (ethylated, slight acid modification) and Clineo 712 (ethylated, more acid modification). The control starches were commercially available as Clinton 106 (unmodified pearl starch) and Wallboard Binder (acid modified, non-ethylated) (Tate & Lyle—Decatur, IL).

The nail pull strength of the gypsum boards was measured against the board weight as described above. As shown in FIG. 4, gypsum board containing ethylated/acid modified starch exhibited improved nail pull strength in comparison to either acid modified starch without ethylation, or ethylated starch without acid modification.

Those of skill in the art will appreciate that these improvements can be achieved through using one starch type or a combination of starches with different degrees of thinning. The starch(es) can be introduced into the board manufacturing process either singly or in combination, and in a variety of means ranging from dry, pre-mixed in the stucco or wet, in the pulp, foam, foam water, gauging water, etc.

Although the invention has been described in detail with reference to preferred embodiments, variations and modifications exist within the scope and spirit of the invention as described and defined in the following claims.

What is claimed is:

1. A gypsum board, comprising:
 a gypsum core formed from a gypsum slurry having a composition comprising stucco, a starch, and an aqueous foam,
  wherein the starch comprises an acid modified starch and a chemically modified starch, wherein the chemically modified starch is chemically modified by ethoxylation.

2. The gypsum board of claim 1, wherein the gypsum board exhibits a nail pull resistance of from about 68 lbf to about 91 lbf in accordance with ASTM C473.

3. The gypsum board of claim 1, wherein the acid modified starch has a peak viscosity of between about 200 BU to about 2000 BU.

4. The gypsum board of claim 1, wherein the acid modified starch has a peak viscosity of between about 200 BU to about 800 BU.

5. The gypsum board of claim 1, wherein the acid modified starch has a peak viscosity of between about 800 BU to about 2000 BU.

6. The gypsum board of claim 1, wherein the chemically modified starch has a peak gelling temperature of about 180° F. or less.

7. The gypsum board of claim 1, wherein the chemically modified starch has a peak gelling temperature of about 170° F. or less.

8. The gypsum board of claim 1, wherein the chemically modified starch has a peak gelling temperature of about 165° F. or less.

9. The gypsum board of claim 1, wherein the chemically modified starch has a peak gelling temperature of between about 145° F. to about 170° F.

10. The gypsum board of claim 1, wherein the chemically modified starch has a peak gelling temperature of between about 150° F. to about 165° F.

11. The gypsum board of claim 1, further comprising:
 a first facing material positioned on the front side of the gypsum core and a second facing material positioned on the back side of the gypsum core.

12. The gypsum board of claim 1, wherein the gypsum core has a front side, a back side, and a center core between the front and back sides, wherein the gypsum core has a ratio of the acid modified starch content at the front and back sides of the gypsum core to the acid modified starch content in the center core of between about 1.0 to 1.7.

13. The gypsum board of claim 1, wherein the gypsum core has a front side, a back side, and a center core between the front and back sides, wherein the gypsum core has a ratio of the acid modified starch content at the front and back sides of the gypsum core to the acid modified starch content in the center core of between about 1.2 to 1.5.

14. The gypsum board of claim 1, wherein the gypsum board has a weight of from about 1255 lbs/MSF to about 1478 lbs/MSF.

\* \* \* \* \*